US010339326B2

(12) United States Patent
Negahdar et al.

(10) Patent No.: US 10,339,326 B2
(45) Date of Patent: Jul. 2, 2019

(54) CABLE MODEM ANTI-CLONING

(71) Applicant: ARRIS Enterprises LLC, Suwanee, GA (US)

(72) Inventors: Ali Negahdar, Duluth, GA (US); Wade E. Carter, Johns Creek, GA (US)

(73) Assignee: ARRIS Enterprises LLC, Suwanee, GA (US)

( * ) Notice: Subject to any disclaimer, the term of this patent is extended or adjusted under 35 U.S.C. 154(b) by 135 days.

(21) Appl. No.: 15/458,510

(22) Filed: Mar. 14, 2017

(65) Prior Publication Data
US 2017/0262637 A1    Sep. 14, 2017

Related U.S. Application Data

(60) Provisional application No. 62/404,804, filed on Oct. 6, 2016, provisional application No. 62/307,922, filed on Mar. 14, 2016.

(51) Int. Cl.
| H04L 29/06 | (2006.01) |
| G06F 21/60 | (2013.01) |
| H04L 9/08  | (2006.01) |
| H04L 12/28 | (2006.01) |

(52) U.S. Cl.
CPC .......... *G06F 21/602* (2013.01); *H04L 9/0869* (2013.01); *H04L 12/2801* (2013.01); *H04L 12/2898* (2013.01); *H04L 63/0876* (2013.01); *H04L 63/1466* (2013.01)

(58) Field of Classification Search
CPC ............ H04L 63/1466; H04L 63/0876; H04L 9/0869
See application file for complete search history.

(56) References Cited

U.S. PATENT DOCUMENTS

| 7,006,446 | B1 * | 2/2006  | Anderson | H04J 3/0682 |
|           |      |         |          | 348/180     |
| 9,081,963 | B1 * | 7/2015  | Sima     | G06F 21/57  |
| 2007/0294738 | A1 * | 12/2007 | Kuo      | H04N 21/4263 |
|           |      |         |          | 725/116     |

(Continued)

OTHER PUBLICATIONS

PCT Search Report & Written Opinion, Re: Application No. PCT/US2017/022309, dated May 31, 2017.

(Continued)

*Primary Examiner* — Morshed Mehedi
(74) *Attorney, Agent, or Firm* — Bart A. Perkins

(57) ABSTRACT

Methods, systems, and computer readable media can be operable to facilitate the encryption of a device identifier using an identification property of a SoC. A unique identifier of a cable modem may be encrypted using a unique key or other unique property of a SoC associated with the cable modem. When an authentication process is initiated at the cable modem, the encrypted unique identifier of the cable modem may be decrypted using the unique key or other unique property of the SoC, thereby producing the unique identifier of the cable modem. The decrypted unique identifier of the cable modem may be output from the cable modem to an upstream controller during the authentication process. In embodiments, an obfuscation key may be used to encrypt and decrypt the unique identifier of the cable modem, and the obfuscation key may be generated using a unique identifier of the SoC.

20 Claims, 6 Drawing Sheets

(56) References Cited

U.S. PATENT DOCUMENTS

2011/0302416 A1\* 12/2011 Hoshen .............. H04L 63/0428
713/168
2013/0006784 A1\* 1/2013 Krauss ................ H04L 9/3231
705/18

OTHER PUBLICATIONS

B. Rodrigues, "Hacking Cable Modems the Later Years", Nullbyte Security Conference 2015, Nov. 21, 2015, retrieved from the Internet on May 19, 2017 at URL: https://github.com/bmaia/slides/raw/master/nullbyte_2015-hacking_cable_modems_the_later_years.pdf, pp. 42, 84, 86.

\* cited by examiner

CABLE MODEM ANTI-CLONING

CROSS REFERENCE TO RELATED APPLICATION

This application is a non-provisional application claiming the benefit of U.S. Provisional Application Ser. No. 62/307,922, entitled "Mating Device Address with System-on-a-Chip," which was filed on Mar. 14, 2016, and further claims the benefit of U.S. Provisional Application Ser. No. 62/404,804, entitled "Cable Modem Anti-Cloning," which was filed on Oct. 6, 2016, each of which is incorporated herein by reference in its entirety.

TECHNICAL FIELD

This disclosure relates to the prevention of cable modem cloning.

BACKGROUND

The data over cable service interface specification (DOCSIS) does not fully address cable modem anti-cloning. The DOCSIS standard requires the cable modem device certificate's subject common name to contain the cable modem media access control (MAC) address. The baseline privacy interface plus (BPI+) authentication fails if a cable modem termination system (CMTS) detects that the common name in the cable modem device certificate does not match the device cable modem MAC address. DOCSIS recommends the policy for CMTS to enforce BPI+ on all cable modems. However, if a cable modem is fully cloned, that is to clone the entire non-volatile random-access memory (NVRAM) which contains both the device certificate and cable modem MAC address, then the DOCSIS anti-cloning recommendation will not be sufficient. The number of reported clones has been drastically increasing and Internet service providers (ISPs) have difficulties keeping up and dealing with clone devices. Therefore, a need exists for improving methods and systems for preventing cable modem cloning.

BRIEF DESCRIPTION OF THE DRAWINGS

Like reference numbers and designations in the various drawings indicate like elements.

DETAILED DESCRIPTION

Since the issue of cable modem cloning cannot be addressed merely by enforcing CMTS BPI+ policy, there needs to be some degree of cable modem device level protection to prevent MAC address cloning. Described herein is a method and system to mate the cable modem MAC address to the system-on-a-chip (SOC) on that device in a way that the cable modem MAC address cannot be cloned on any other devices. Moreover, the methods and systems described herein do not require the MAC address to be fused into the one-time programmable (OTP) of the SOC. Not all SOCs support OEM (original equipment manufacturer) data customization in OTP. Also, fusing the MAC address into the OTP requires SOC customization and complicates the manufacturing process and device return/repair processes.

Methods, systems, and computer readable media can be operable to facilitate the encryption of a device identifier using an identification property of a SoC. A unique identifier of a cable modem may be encrypted using a unique key or other unique property of a SoC associated with the cable modem. When an authentication process is initiated at the cable modem, the encrypted unique identifier of the cable modem may be decrypted using the unique key or other unique property of the SoC, thereby producing the unique identifier of the cable modem. The decrypted unique identifier of the cable modem may be output from the cable modem to an upstream controller during the authentication process. In embodiments, an obfuscation key may be used to encrypt and decrypt the unique identifier of the cable modem, and the obfuscation key may be generated using a unique identifier of the SoC.

Figure 1:
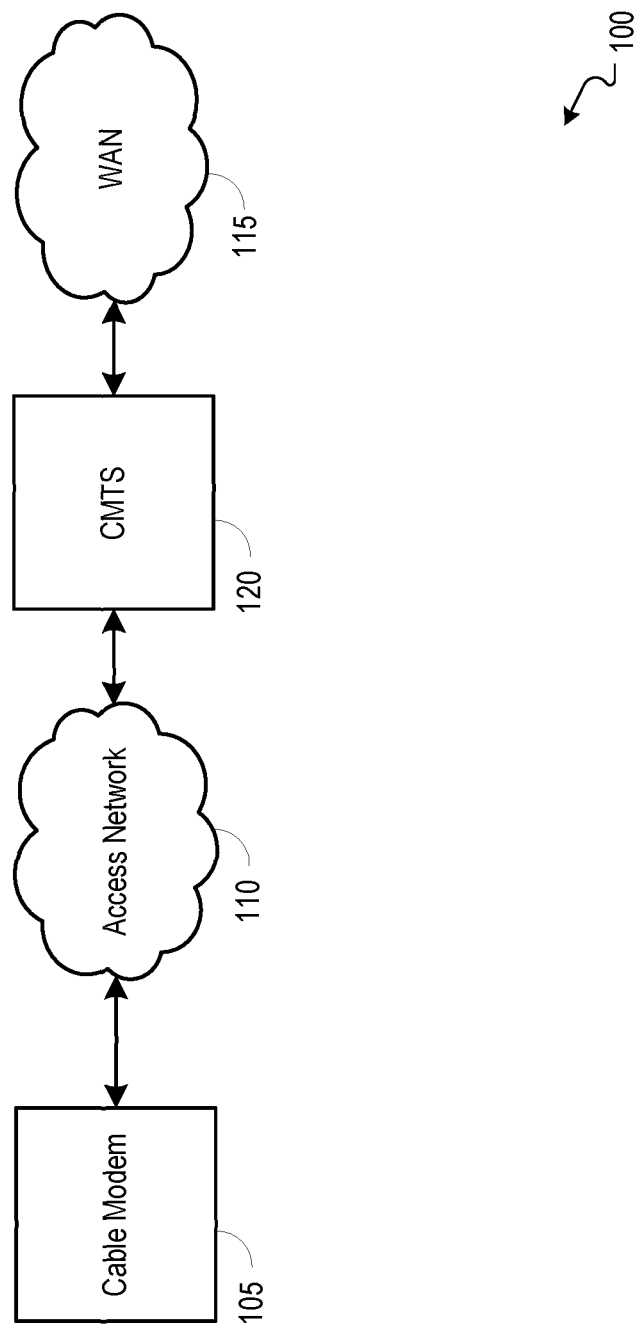
FIG. 1 is a block diagram illustrating an example network environment operable to facilitate the encryption of a device identifier using an identification property of a SoC.

FIG. 1 is a block diagram illustrating an example network environment 100 operable to facilitate the encryption of a device identifier using an identification property of a SoC. In embodiments, a cable modem 105 may receive and/or deliver one or more services (e.g., video, data, voice, security, and/or other service(s)) to a subscriber. The cable modem 105 may be a stand-alone cable modem or may be embedded within a set-top box (STB), multimedia gateway device, router, wireless extender, and/or various other devices.

In embodiments, the cable modem 105 may receive the one or more services and may transmit and receive other communications to and from one or more upstream network components through an access network 110 and a wide-area network (WAN) 115. The access network 110 may include any of a variety of communication links between the cable modem 105 and a WAN 115, such as a hybrid-fiber coaxial (HFC) network, and others.

In embodiments, a cable modem 105 may communicate with a CMTS (cable modem termination system) 120 or other central device located upstream from the cable modem 105. For example, during run-time, the cable modem 105 may go through an authentication process with a CMTS 120 to verify that permission has been given for the cable modem 105 to provide one or more services to a subscriber. Once the authentication process has been successfully completed, the CMTS 120 may deliver one or more services to the cable modem 105 according to a subscription associated with the cable modem 105. The authentication process between the cable modem 105 and the CMTS 120 may include a transmission of a unique identifier of the cable modem 105 to the CMTS 120 and a verification by the CMTS 120 that the cable modem 105, as identified by the unique identifier, has permission to provide one or more services to a subscriber premise. For example, the unique identifier of the cable modem 105 may be a MAC (media-access control) address associated with the cable modem 105 or other identifier associated with the cable modem 105. The authentication process between the cable modem 105 and CMTS 120 may be a baseline privacy interface plus (BPI+) authentication process wherein the cable modem 105 populates a BPI+ authorization request with the MAC address of the cable modem 105 and transmits the BPI+ authorization request to the CMTS 120. It should be understood that the authentication process may include various other processes.

In embodiments, a unique identifier of a cable modem 105 (e.g., MAC address of the cable modem 105) may be mated to a SoC of the cable modem 105 such that the SoC becomes necessary for storage and retrieval of the MAC address for purposes of authenticating the cable modem 105 with a CMTS 120. Without access to the SoC of the cable modem 105, a device attempting to clone the cable modem 105 is thereby precluded from delivering a valid MAC address to the CMTS 120. For example, the MAC address of the cable modem 105 may be encrypted using one or more properties unique to the SoC of the cable modem 105.

A hardware based solution for mating a MAC address of a cable modem 105 to a SoC of the cable modem 105 may be implemented within the cable modem 105. The hardware based solution may be used when the SoC of the cable modem 105 supports hardware root of trust and hardware based key ladder. In embodiments, the MAC address of the cable modem 105 may be protected with a unique hardware based device key associated with the SoC of the cable modem 105. For example, during manufacturing of the cable modem 105, the MAC address of the cable modem 105 may be passed to a security engine of the cable modem 105 SoC to be encrypted and signed using the hardware based device key associated with the SoC. For example, the hardware based device key associated with the SoC may be used as an encryption/decryption key for encrypting/decrypting the MAC address of the cable modem 105. The security engine may generate one or more encryption/decryption keys from the hardware based device key associated with the SoC. The hardware based device key associated with the SoC may be protected in hardware and protected from access outside of the security engine. The output from the security engine is an encrypted MAC address that can only be decrypted and authenticated by the same SoC that encrypted/signed the MAC address. The encrypted MAC address may be stored on the cable modem 105 (e.g., in NVRAM (non-volatile random-access memory)). At runtime, the cable modem 105 retrieves the encrypted MAC address, decrypts and validates the encrypted MAC address using the hardware based device key associated with the SoC and uses the validated MAC address in the BPI+ authentication process. If a cable modem 105 is cloned, the encrypted MAC address cannot be decrypted/verified by the clone, as the clone would not have access to the hardware based device key associated with the SoC that was used to encrypt the MAC address. Thus, the clone would not be able to populate the BPI+ authorization request message with the proper MAC address.

In embodiments, if the SoC of a cable modem 105 does not support a hardware based key ladder, a software based obfuscation may be implemented. The software based solution provides a mechanism to mate a MAC address of a cable modem 105 to a SoC of the cable modem 105 by generating an obfuscation key that is based on one or more unique properties of the SoC. The seed (or part of the seed) to generate the obfuscation key may be a unique identifier of the SoC of the cable modem 105, and the seed would not be stored at non-volatile memory of the cable modem 105. During manufacturing, the MAC address of the cable modem 105 may be passed to an obfuscation engine of the cable modem 105. The obfuscation engine may fetch the unique identifier of the SoC from the SoC and may use the unique identifier as part of the seed to generate the obfuscation key. Since the unique identifier of the SoC is unique to each SoC and cable modem 105, the obfuscation key will be unique to that cable modem 105. The obfuscation engine may encrypt and sign the MAC address of the cable modem 105 using the obfuscation key. For example, the obfuscation key may be used as the encryption key for encrypting the MAC address of the cable modem. The encrypted MAC address may be stored in NVRAM of the cable modem 105. At runtime, the cable modem 105 may retrieve the encrypted MAC address and decrypt and validate the MAC Address using a de-obfuscation engine. The de-obfuscation engine may use the unique identifier of the SoC to generate a de-obfuscation key. For example, the de-obfuscation key may be used as a decryption key for decrypting the encrypted MAC address. The cable modem 105 may use the validated MAC address in the BPI+ authentication process. Without access to the unique identifier of the SoC and de-obfuscation key, a BPI+ authorization request will fail on a clone since the clone would not have access to the SOC ID used to create the obfuscation key. Instead the clone would use a unique identifier of a SoC associated with the clone as the input to the de-obfuscation engine to decrypt/verify the secure MAC address, thereby producing an invalid MAC address.

Figure 2:
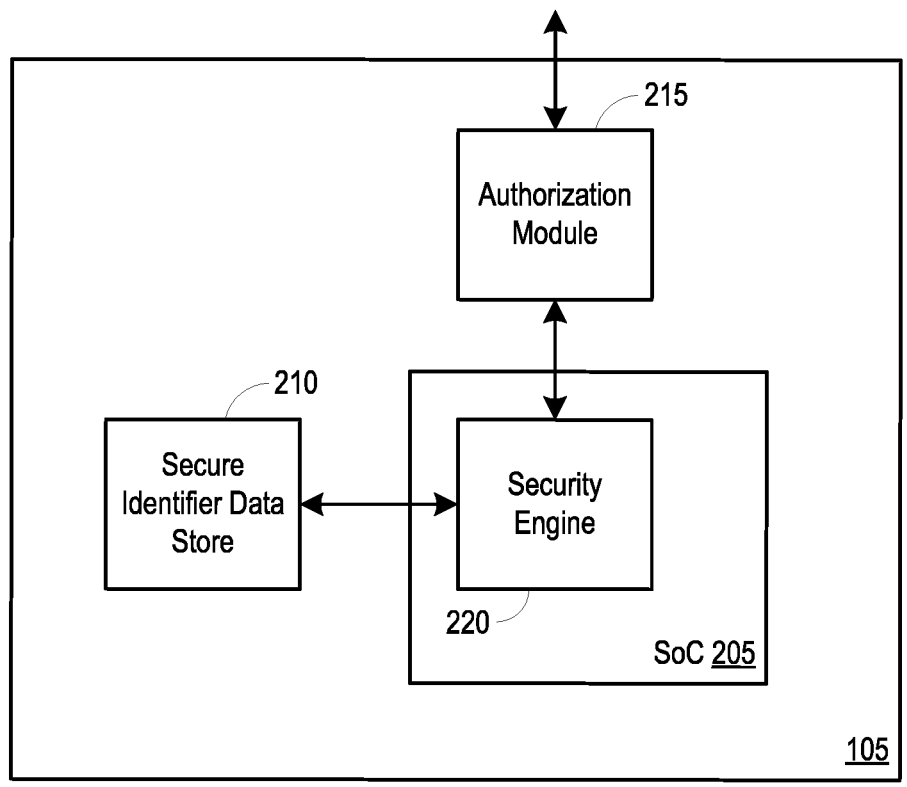
FIG. 2 is a block diagram illustrating an example cable modem operable to facilitate the encryption of a device identifier using an identification property of a SoC.

FIG. 2 is a block diagram illustrating an example cable modem 105 operable to facilitate the encryption of a device identifier using an identification property of a SoC. In embodiments, the cable modem 105 may include a SoC (system-on-a-chip) 205, a secure identifier data store 210, and an authorization module 215. The SoC 205 may include a security engine 220.

In embodiments, the security engine 220 of the SoC 205 may retrieve the MAC address of the cable modem 105. The security engine 220 may retrieve a hardware based device key associated with the SoC 205, and the security engine 220 may encrypt and sign the retrieved MAC address using the hardware based device key associated with the SoC 205. For example, the security engine 220 may use the device key associated with the SoC 205 as an encryption key for encrypting the MAC address of the cable modem 105. The security engine 220 may output the encrypted MAC address to the secure identifier data store 210. In embodiments, the secure identifier data store 210 may include NVRAM.

At runtime, the security engine 220 may retrieve the encrypted MAC address from the secure identifier data store 210. In embodiments, the security engine 220 may decrypt and validate the encrypted MAC address using the hardware based device key associated with the SoC 205. For example, the security engine 220 may use the device key as a decryption key for decrypting the encrypted MAC address of the cable modem 105. Following decryption and validation of the encrypted MAC address, the security engine 220 may pass the validated MAC address to the authorization module 215, and the authorization module 215 may output the MAC address to an upstream controller (e.g., CMTS 120 of FIG. 1) as part of an authentication process between the cable modem 105 and upstream controller. For example, the authorization module 215 may populate a BPI+ authorization request message with the MAC address and may output the BPI+ authorization request message to a CMTS 120.

Figure 3:
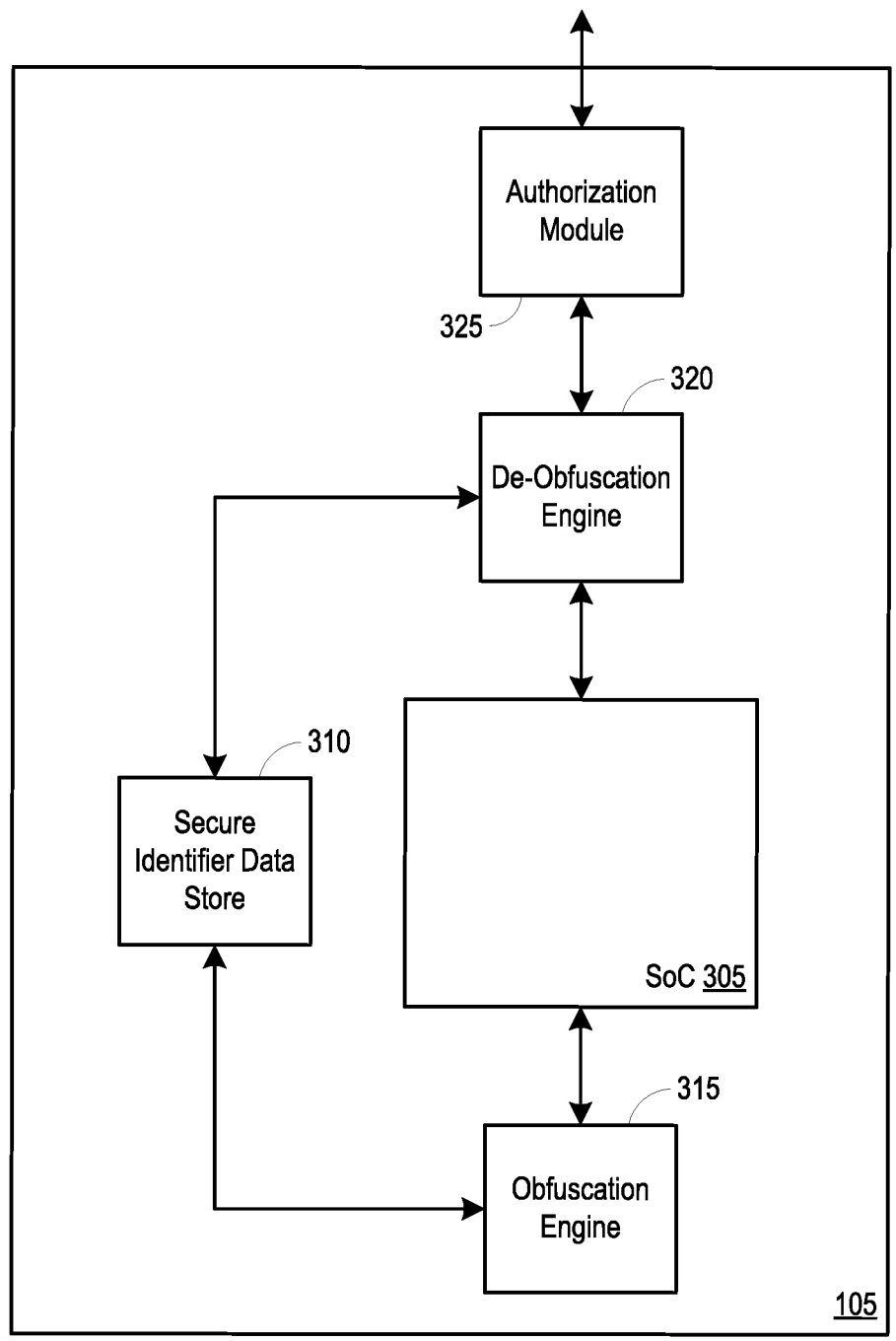
FIG. 3 is a block diagram illustrating an example cable modem operable to facilitate the encryption of a device identifier using an obfuscation key generated from an identification property of a SoC.

FIG. 3 is a block diagram illustrating an example cable modem 105 operable to facilitate the encryption of a device identifier using an obfuscation key generated from an identification property of a SoC. In embodiments, the cable modem 105 may include a SoC (system-on-a-chip) 305, a secure identifier data store 310, an obfuscation engine 315, a de-obfuscation engine 320, and an authorization module 325.

In embodiments, the obfuscation engine 315 may generate an obfuscation key that is based on one or more unique properties of the SoC 305. The seed (or part of the seed) to generate the obfuscation key may be a unique identifier of the SoC 305. For example, the obfuscation engine 315 may fetch the unique identifier of the SoC 305 from the SoC 305 and may use the unique identifier as part of the seed to generate the obfuscation key. The MAC address of the cable modem 105 may be retrieved by the obfuscation engine 315, and the obfuscation engine 315 may encrypt and sign the MAC address of the cable modem 105 using the obfuscation key. For example, the obfuscation engine 315 may use the obfuscation key as an encryption key for encrypting the MAC address of the cable modem 105. The encrypted MAC address may be stored in NVRAM of the cable modem 105 (e.g., at the secure identifier data store 310).

At runtime, the de-obfuscation engine 320 may retrieve the encrypted MAC address from the secure identifier data store 310, and the de-obfuscation engine 320 may decrypt and validate the MAC Address using a de-obfuscation key. The de-obfuscation key may be a key generated by the de-obfuscation engine from the unique identifier of the SoC 305. The de-obfuscation engine 320 may use the de-obfuscation key as a decryption key for decrypting the encrypted MAC address of the cable modem 105. The cable modem 105 may use the validated MAC address in the BPI+ authentication process. Following decryption and validation of the encrypted MAC address, the de-obfuscation engine 320 may pass the validated MAC address to the authorization module 325, and the authorization module 325 may output the MAC address to an upstream controller (e.g., CMTS 120 of FIG. 1) as part of an authentication process between the cable modem 105 and upstream controller. For example, the authorization module 325 may populate a BPI+ authorization request message with the MAC address and may output the BPI+ authorization request message to a CMTS 120.

Figure 4:
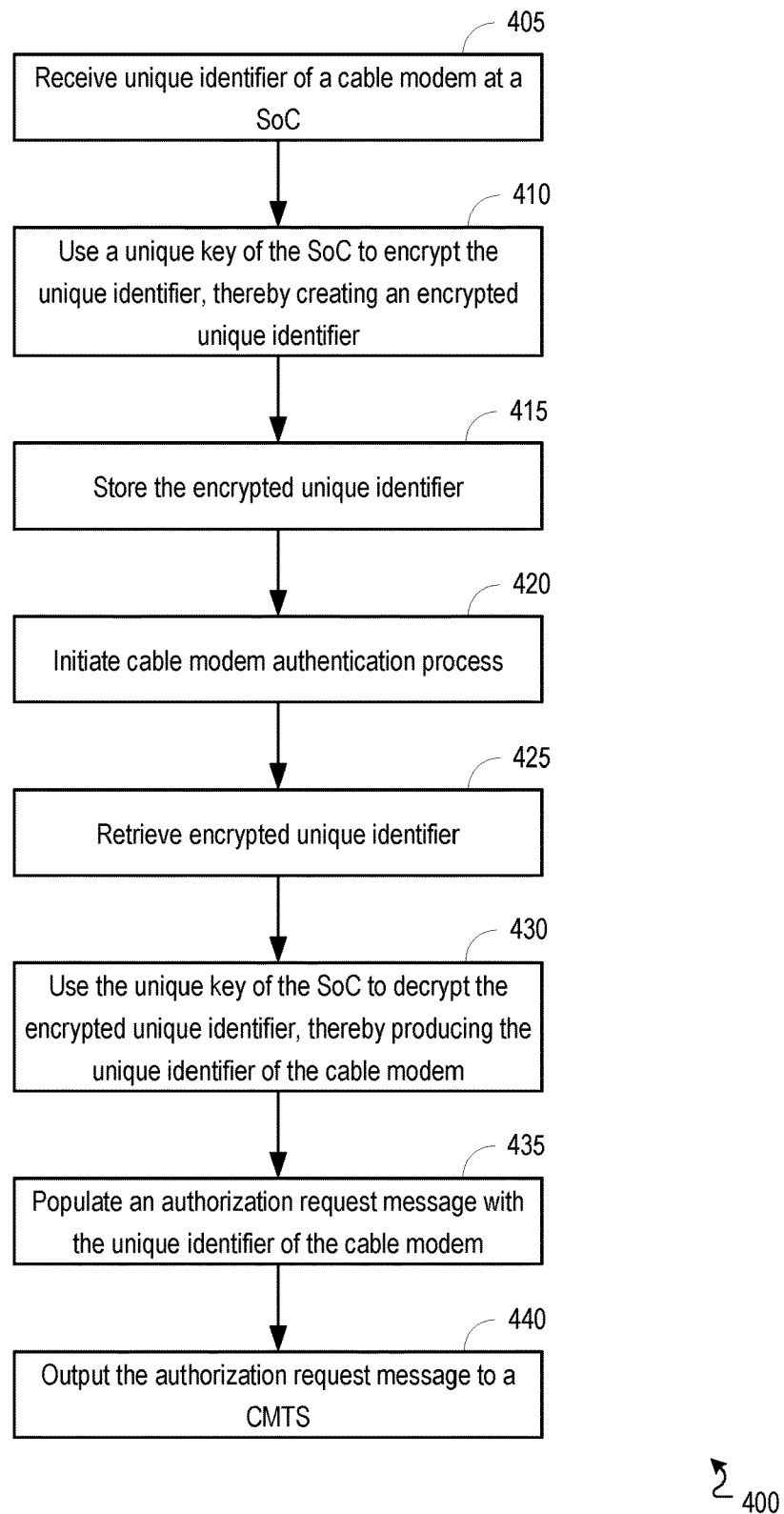
FIG. 4 is a flowchart illustrating an example process operable to facilitate the encryption of a device identifier using an identification property of a SoC.

FIG. 4 is a flowchart illustrating an example process 400 operable to facilitate the encryption of a device identifier using an identification property of a SoC. The process 400 can begin at 405 where a unique identifier of a cable modem is received at a SoC (e.g., SoC 205 of FIG. 2) associated with the cable modem. For example, the unique identifier of the cable modem (e.g., cable modem 105 of FIG. 1) may be received by a security engine (e.g., security engine 220 of FIG. 2) of the SoC (e.g., SoC 205 of FIG. 2) associated with the cable modem 105. In embodiments, the unique identifier of the cable modem 105 may be a MAC address associated with the cable modem 105.

At 410, a unique key of the SoC may be used to encrypt the unique identifier of the cable modem, thereby creating an encrypted unique identifier associated with the cable modem. The unique identifier of the cable modem may be encrypted, for example, by the security engine (e.g., security engine 220) of the SoC associated with the cable modem 105. In embodiments, the security engine 220 may retrieve the unique identifier (e.g., MAC address) of the cable modem 105 and the unique key of the SoC (e.g., hardware based device key associated with the SoC 205). The security engine 220 may encrypt and sign the retrieved unique identifier using the hardware based device key associated with the SoC 205. For example, the security engine 220 may use the hardware based device key as an encryption key for encrypting the unique identifier of the cable modem 105.

At 415, the encrypted unique identifier of the cable modem may be stored. The encrypted unique identifier of the cable modem may be stored, for example, at storage associated with the cable modem (e.g., at the secure identifier data store 210 of FIG. 2). In embodiments, the encrypted unique identifier of the cable modem may be stored within NVRAM of the cable modem 105.

At 420, a cable modem authentication process may be initiated. For example, the cable modem authentication process may be a process for authenticating the cable modem with an upstream controller (e.g., CMTS 120 of FIG. 1). The authentication process may be a BPI+ authentication process or other process for authenticating a cable modem at an upstream controller. In embodiments, the authentication process may be initiated when the cable modem requests one or more services or permission to access the upstream controller.

At 425, the encrypted unique identifier of the cable modem may be retrieved. The encrypted unique identifier may be retrieved, for example, by the security engine of the cable modem SoC (e.g., security engine 220). In embodiments, the security engine 220 may retrieve the encrypted unique identifier (e.g., encrypted MAC address) from storage at the cable modem (e.g., from the secure identifier data store 210).

At 430, the encrypted unique identifier of the cable modem may be decrypted using the unique key of the SoC, thereby producing the unique identifier of the cable modem. The encrypted unique identifier may be decrypted, for example, by the security engine (e.g., security engine 220 of FIG. 2) of the SoC associated with the cable modem. In embodiments, the security engine 220 may decrypt and validate the encrypted unique identifier (e.g., MAC address) using the hardware based device key associated with the SoC 205 to produce the unique identifier associated with the cable modem. For example, the security engine 220 may use the hardware based device key as a decryption key for decrypting the encrypted unique identifier of the cable modem 105.

At 435, an authorization request message may be populated with the unique identifier of the cable modem. The authorization request message may be populated with the unique identifier of the cable modem, for example, by an authorization module (e.g., authorization module 215 of FIG. 2) of the cable modem. In embodiments, the authorization request message may be a BPI+ authorization request message. The authorization request message may be output from the cable modem to an upstream controller (e.g., CMTS 120 of FIG. 1) at 440.

Figure 5:
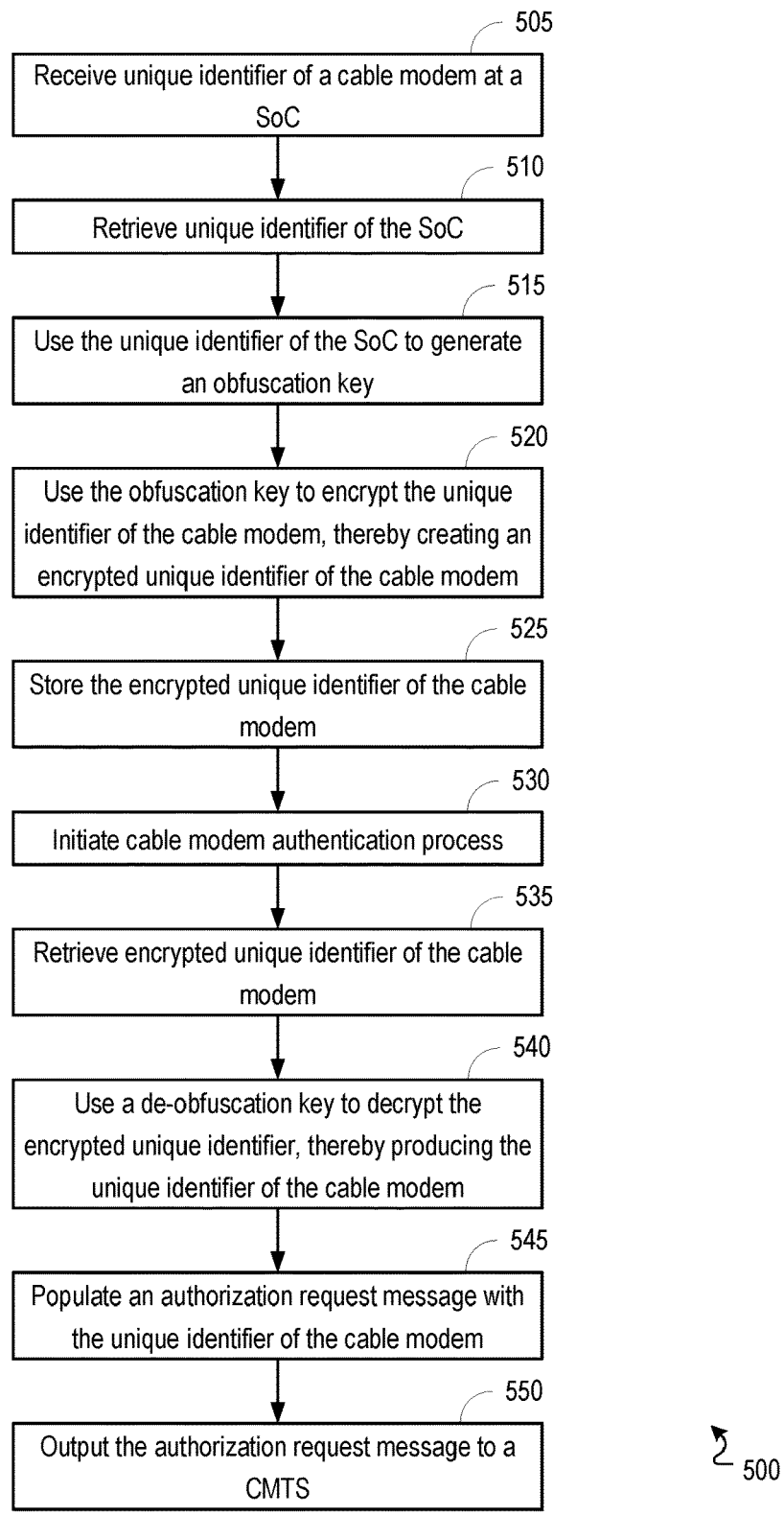
FIG. 5 is a flowchart illustrating an example process operable to facilitate the encryption of a device identifier using an obfuscation key generated from an identification property of a SoC.

FIG. 5 is a flowchart illustrating an example process 500 operable to facilitate the encryption of a device identifier using an obfuscation key generated from an identification property of a SoC. The process 500 can begin at 505 where a unique identifier of a cable modem is received at a SoC (e.g., SoC 305 of FIG. 3) associated with the cable modem. For example, the unique identifier of the cable modem (e.g., cable modem 105 of FIG. 1) may be received by an obfuscation engine (e.g., obfuscation engine 315 of FIG. 3). In embodiments, the unique identifier of the cable modem 105 may be a MAC address associated with the cable modem 105.

At 510, a unique identifier of a SoC associated with the cable modem may be retrieved. The unique identifier of the SoC may be retrieved, for example, by an obfuscation engine (e.g., obfuscation engine 315 of FIG. 3). In embodiments, the obfuscation engine 315 may retrieve the unique identifier of the SoC from the SoC of the cable modem 105

(e.g., from the SoC 305 of FIG. 3). The unique identifier of the SoC may be an identifier or other unique property of the SoC 305.

At 515, the unique identifier of the SoC may be used to generate an obfuscation key. The obfuscation key may be generated, for example, by an obfuscation engine (e.g., obfuscation engine 315 of FIG. 3). In embodiments, the obfuscation engine 315 may generate an obfuscation key that is based on the unique identifier of the SoC 305. A seed (or part of a seed) to generate the obfuscation key may be the retrieved unique identifier of the SoC 305.

At 520, the obfuscation key may be used to encrypt the unique identifier of the cable modem, thereby creating an encrypted unique identifier associated with the cable modem. The unique identifier of the cable modem may be encrypted, for example, by the obfuscation engine (e.g., obfuscation engine 315). In embodiments, the obfuscation engine 315 may encrypt and sign the unique identifier (e.g., MAC address) of the cable modem 105 using the obfuscation key. For example, the obfuscation engine 315 may use the obfuscation key as an encryption key for encrypting the unique identifier associated with the cable modem 105.

At 525, the encrypted unique identifier of the cable modem may be stored. The encrypted unique identifier of the cable modem may be stored, for example, at storage associated with the cable modem (e.g., at the secure identifier data store 310 of FIG. 3). In embodiments, the encrypted unique identifier of the cable modem may be stored within NVRAM of the cable modem 105.

At 530, a cable modem authentication process may be initiated. For example, the cable modem authentication process may be a process for authenticating the cable modem with an upstream controller (e.g., CMTS 120 of FIG. 1). The authentication process may be a BPI+ authentication process or other process for authenticating a cable modem at an upstream controller. In embodiments, the authentication process may be initiated when the cable modem requests one or more services or permission to access the upstream controller.

At 535, the encrypted unique identifier of the cable modem may be retrieved. The encrypted unique identifier may be retrieved, for example, by a de-obfuscation engine of the cable modem 105 (e.g., de-obfuscation engine 320 of FIG. 3). In embodiments, the de-obfuscation engine 320 may retrieve the encrypted unique identifier (e.g., encrypted MAC address) from storage at the cable modem 105 (e.g., from the secure identifier data store 310).

At 540, the encrypted unique identifier of the cable modem may be decrypted using a de-obfuscation key, thereby producing the unique identifier of the cable modem. The encrypted unique identifier may be decrypted, for example, by the de-obfuscation engine (e.g., de-obfuscation engine 320 of FIG. 3). In embodiments, the de-obfuscation engine 320 may decrypt and validate the unique identifier (e.g., MAC address) of the cable modem 105 using a de-obfuscation key to produce the unique identifier associated with the cable modem 105. The de-obfuscation key may be a key generated by the de-obfuscation engine 320 from the unique identifier of the SoC 305 (e.g., the unique identifier of the SoC retrieved at 510). The de-obfuscation engine 320 may use the de-obfuscation key as a decryption key for decrypting the encrypted unique identifier associated with the cable modem 105.

At 545, an authorization request message may be populated with the unique identifier of the cable modem. The authorization request message may be populated with the unique identifier of the cable modem, for example, by an authorization module (e.g., authorization module 325 of FIG. 3) of the cable modem 105. In embodiments, the authorization request message may be a BPI+ authorization request message. The authorization request message may be output from the cable modem to an upstream controller (e.g., CMTS 120 of FIG. 1) at 550.

Figure 6:
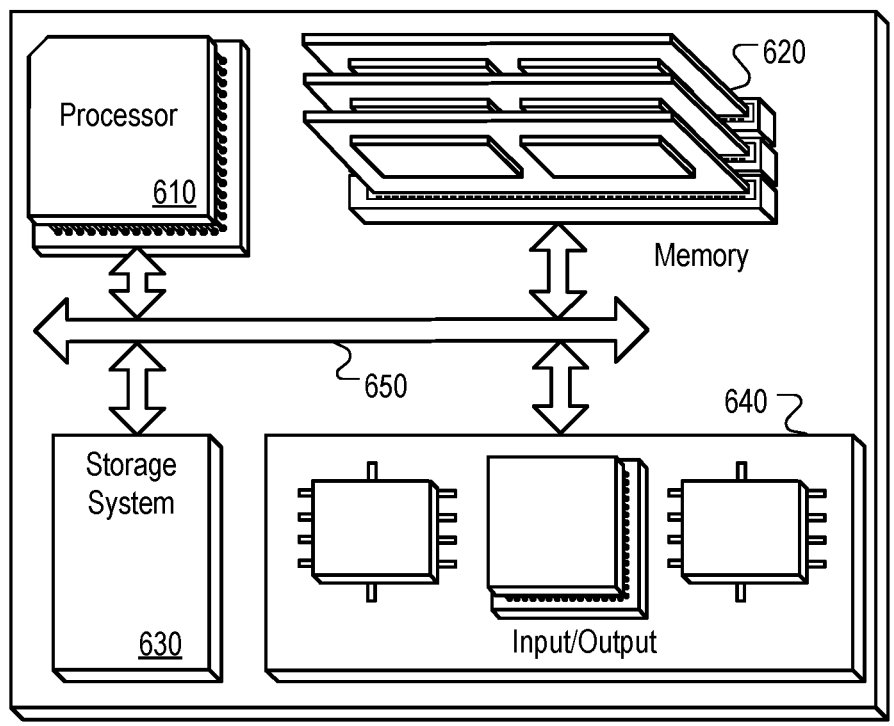
FIG. 6 is a block diagram of a hardware configuration operable to facilitate the encryption of a device identifier using an identification property of a SoC.

FIG. 6 is a block diagram of a hardware configuration 600 operable to facilitate the encryption of a device identifier using an identification property of a SoC. The hardware configuration 600 can include a processor 610, a memory 620, a storage device 630, and an input/output device 640. Each of the components 610, 620, 630, and 640 can, for example, be interconnected using a system bus 650. The processor 610 can be capable of processing instructions for execution within the hardware configuration 600. In one implementation, the processor 610 can be a single-threaded processor. In another implementation, the processor 610 can be a multi-threaded processor. The processor 610 can be capable of processing instructions stored in the memory 620 or on the storage device 630.

The memory 620 can store information within the hardware configuration 600. In one implementation, the memory 620 can be a computer-readable medium. In one implementation, the memory 620 can be a volatile memory unit. In another implementation, the memory 620 can be a non-volatile memory unit.

In some implementations, the storage device 630 can be capable of providing mass storage for the hardware configuration 600. In one implementation, the storage device 630 can be a computer-readable medium. In various different implementations, the storage device 630 can, for example, include a hard disk device, an optical disk device, flash memory or some other large capacity storage device. In other implementations, the storage device 630 can be a device external to the hardware configuration 600.

The input/output device 640 provides input/output operations for the hardware configuration 600. In embodiments, the input/output device 640 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video, voice, data, and/or other services to a device (e.g., cable modem 105 of FIG. 1, customer premise equipment (CPE) device, client device, etc.). In embodiments, the input/output device can include driver devices configured to send communications to, and receive communications from one or more networks (e.g., access network 110 of FIG. 1, WAN 115 of FIG. 1, etc.).

Those skilled in the art will appreciate that the invention improves upon methods and systems for preventing cable modem cloning. Methods, systems, and computer readable media can be operable to facilitate the encryption of a device identifier using an identification property of a SoC. A unique identifier of a cable modem may be encrypted using a unique key or other unique property of a SoC associated with the cable modem. When an authentication process is initiated at the cable modem, the encrypted unique identifier of the cable modem may be decrypted using the unique key or other unique property of the SoC, thereby producing the unique identifier of the cable modem. The decrypted unique identifier of the cable modem may be output from the cable modem to an upstream controller during the authentication process. In embodiments, an obfuscation key may be used to encrypt and decrypt the unique identifier of the cable modem, and the obfuscation key may be generated using a unique identifier of the SoC.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:
    retrieving a unique identifier associated with a cable modem, wherein the unique identifier associated with the cable modem is retrieved by a security engine of a system-on-a-chip that is associated with the cable modem;
    retrieving a unique key associated with the system-on-a-chip, wherein the unique key associated with the system-on-a-chip is retrieved by the security engine;
    producing, at the security engine, an encrypted unique identifier, wherein the encrypted unique identifier is produced by using the unique key as an encryption key to encrypt the unique identifier associated with the cable modem;
    storing the encrypted unique identifier at the cable modem;
    initiating an authentication process at the cable modem;
    producing, at the security engine, the unique identifier associated with the cable modem, wherein the unique identifier associated with the cable modem is produced by using the unique key as a decryption key to decrypt the encrypted unique identifier; and
    outputting the unique identifier associated with the cable modem to an upstream controller, wherein the unique identifier associated with the cable modem is output as an authorization request message.

2. The method of claim 1, wherein the unique key associated with the system-on-a-chip comprises a hardware based device key associated with the system-on-a-chip.

3. The method of claim 1, wherein retrieving the unique key associated with the system-on-a-chip comprises:
    retrieving a unique identifier associated with the system-on-a-chip; and using the unique identifier associated with the system-on-a-chip as a seed to generate the unique key associated with the system-on-a-chip.

4. The method of claim 1, further comprising:
storing the encrypted unique identifier within non-volatile random-access memory of the cable modem.

5. The method of claim 1, wherein the unique identifier associated with the cable modem comprises a media access control address associated with the cable modem.

6. The method of claim 1, wherein the upstream controller comprises a cable modem termination system.

7. The method of claim 1, wherein the authorization request message comprises a baseline privacy interface plus authorization request message.

8. A cable modem comprising a system-on-a-chip having a security engine, the security engine being configured to:
retrieve a unique identifier associated with the cable modem;
retrieve a unique key associated with the system-on-a-chip;
produce an encrypted unique identifier by using the unique key as an encryption key to encrypt the unique identifier associated with the cable modem;
store the encrypted unique identifier at the cable modem; and
in response to an initiation of an authentication process at the cable modem:
produce the unique identifier associated with the cable modem by using the unique key as a decryption key to decrypt the encrypted unique identifier; and
output the unique identifier associated with the cable modem to an upstream controller, wherein the unique identifier associated with the cable modem is output as an authorization request message.

9. The cable modem of claim 8, wherein the unique key associated with the system-on-a-chip comprises a hardware based device key associated with the system-on-a-chip.

10. The cable modem of claim 8, wherein retrieving the unique key associated with the system-on-a-chip comprises:
retrieving a unique identifier associated with the system-on-a-chip; and
using the unique identifier associated with the system-on-a-chip as a seed to generate the unique key associated with the system-on-a-chip.

11. The cable modem of claim 8, further comprising storage configured to store the encrypted unique identifier.

12. The cable modem of claim 8, wherein the unique identifier associated with the cable modem comprises a media access control address associated with the cable modem.

13. The cable modem of claim 8, wherein the authorization request message comprises a baseline privacy interface plus authorization request message.

14. One or more non-transitory computer readable media having instructions operable to cause one or more processors to perform the operations comprising:

retrieving a unique identifier associated with a cable modem, wherein the unique identifier associated with the cable modem is retrieved by a security engine of a system-on-a-chip that is associated with the cable modem;
retrieving a unique key associated with the system-on-a-chip, wherein the unique key associated with the system-on-a-chip is retrieved by the security engine;
producing, at the security engine, an encrypted unique identifier, wherein the encrypted unique identifier is produced by using the unique key as an encryption key to encrypt the unique identifier associated with the cable modem;
storing the encrypted unique identifier at the cable modem;
initiating an authentication process at the cable modem;
producing, at the security engine, the unique identifier associated with the cable modem, wherein the unique identifier associated with the cable modem is produced by using the unique key as a decryption key to decrypt the encrypted unique identifier; and
outputting the unique identifier associated with the cable modem to an upstream controller, wherein the unique identifier associated with the cable modem is output as an authorization request message.

15. The one or more non-transitory computer-readable media of claim 14, wherein the unique key associated with the system-on-a-chip comprises a hardware based device key associated with the system-on-a-chip.

16. The one or more non-transitory computer-readable media of claim 14, wherein retrieving the unique key associated with the system-on-a-chip comprises:
retrieving a unique identifier associated with the system-on-a-chip; and
using the unique identifier associated with the system-on-a-chip as a seed to generate the unique key associated with the system-on-a-chip.

17. The one or more non-transitory computer-readable media of claim 14, wherein the instructions are further operable to cause the one or more processors to perform the operations comprising:
storing the encrypted unique identifier within non-volatile random-access memory of the cable modem.

18. The one or more non-transitory computer-readable media of claim 14, wherein the unique identifier associated with the cable modem comprises a media access control address associated with the cable modem.

19. The one or more non-transitory computer-readable media of claim 14, wherein the upstream controller comprises a cable modem termination system.

20. The one or more non-transitory computer-readable media of claim 14, wherein the authorization request message comprises a baseline privacy interface plus authorization request message.

* * * * *